United States Patent
Tanuma et al.

[11] Patent Number: 4,906,910
[45] Date of Patent: Mar. 6, 1990

[54] DRIVE CIRCUIT FOR A STEPPING MOTOR CONTROL DEVICE

[75] Inventors: Jiro Tanuma; Takao Uchida, both of Tokyo, Japan

[73] Assignee: Oki Electric Industry Co., Ltd., Tokyo, Japan

[21] Appl. No.: 254,685

[22] Filed: Oct. 7, 1988

[30] Foreign Application Priority Data

Oct. 8, 1987 [JP] Japan ................ 62-252464

[51] Int. Cl.$^4$ .............................. H02P 8/00
[52] U.S. Cl. ........................ 318/696; 318/685
[58] Field of Search ................ 318/696, 685

[56] References Cited

U.S. PATENT DOCUMENTS

| | | | |
|---|---|---|---|
| 3,750,000 | 7/1973 | Bruckner et al. | 318/696 |
| 4,107,593 | 8/1978 | Anderson | 318/685 |
| 4,336,484 | 6/1982 | Marinko | 318/696 |
| 4,358,725 | 11/1982 | Brendemuehl | 318/696 |
| 4,431,955 | 2/1984 | Faedi et al. | 318/696 |
| 4,769,585 | 9/1988 | Tanuma et al. | 318/696 |

Primary Examiner—William M. Shoop, Jr.
Assistant Examiner—Saul M. Bergmann
Attorney, Agent, or Firm—Wenderoth, Lind & Ponack

[57] ABSTRACT

A pulse motor control apparatus for a polyphase excitation type pulse motor variably and independently controls excitation currents supplied to excitation coils. Ratios of any excitation current to other excitation currents supplied to the excitation coils are changed stepwise to rotate a composite magnetic field vector forward by those excitation coils each multiple of a real number of a predetermined unit angle at one time for controlling the rotational angle of a rotor of the pulse vector. The pulse motor control apparatus assures fine control for the rotational angle of the rotor compared with prior cases where currents supplied to a plurality of excitation coils are switched on and off for rotational control. Application of the present control apparatus to printers, etc., precludes replacement of gears, etc., due to types of print heads mounted thereon. Additional advantages such as inprovement of a torque ripple upon driving the pulse motor assure extensive application to various fields.

3 Claims, 7 Drawing Sheets

DRIVE CIRCUIT FOR A STEPPING MOTOR CONTROL DEVICE

BACKGROUND OF THE INVENTION

The present invention relates to a stopping motor control apparatus for controlling the rotational angle of a rotor of a stepping motor.

Stepping motors find extensive applications in varieties of business machines such as printers, facsimiles, copying machines and the like. The stopping motor is well controlled, allowing a single pulse to control the rotation of a rotor thereof by a predetermined angle of rotation for carrying objects in a accurate manner highly. In the following, the operation of such a stepping motor will be described taking as an example a printer which utilizes the stepping motor.

A printer of this type comprises a print head mounted on a carriage, in which the print head includes a plurality of printing wires placed thereon in a direction of a printing sheet being carried. The carriage is spaced perpendicularly to the direction of the printing sheet being carried, and simultaneously the printing wires are selectively protruded to impact against the printing sheet via an inked ribbon. The printer thereby prints character information in the form of a dot matrix and a dotted image, etc., along a line thereof, and repeats the operation over a plurality of lines by feeding the printing sheet repeatedly.

The printer further includes a platen around which a printing sheet is wound. To feed the printing sheet in synchronism with the printing operation, i.e., to effect the so-called line-feed, a line feed motor composed of a pulse motor is provided. A stepping is supplied to the line feed motor for rotating the platen by an angle of rotation corresponding to the amount of the line feed of the printing sheet in a predetermined timing established from a host side. The line feed motor hereby drives the platen to feed the printing sheet by an instructed distance.

After the line feed, the line feed motor is allowed to have predetermined retaining torque. The retaining torque is set so as to be enough to prevent a printing sheet from being shifted with ease by an external force and further to permit an operator to feed the printing sheet manually. In fact, the retaining torque ranges from about 1/5 to 1/10 as large as the torque of the line feed motor when it feeds the printing sheet.

Figure 1:
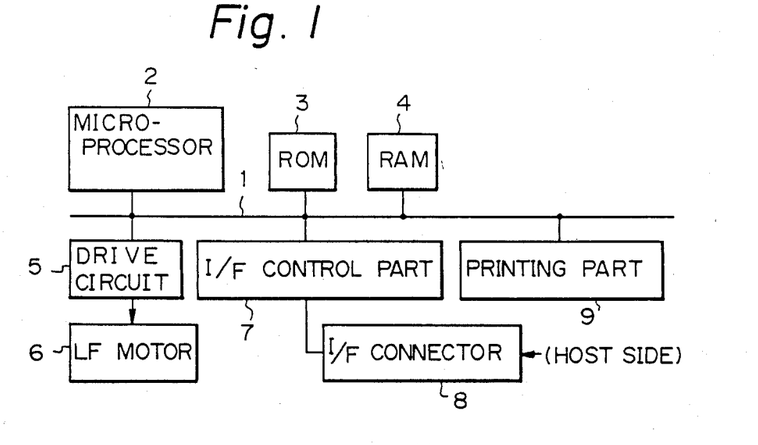
FIG. 1 is a block diagram illustrating a printer controller.

Referring here to FIG. 1, a block diagram of such a printer controller is illustrated. The controller includes a printing part 9 connected to a microprocessor 2, MSM80C154 for example, available from Oki Electric Industry Co., Ltd., via a bus line 1. The microprocessor 2 effects arithmetic operation for the control of the printer. The printing part 9 is comprised of a print head for printing any character on a printing sheet under the control of the microprocessor 2, and of various mechanisms associated with the printer. The control circuit is further comprised of a read only memory (ROM) 3, such as an Intel D27512-NW for example, for storing operating programs, etc., for use in the microprocessor 2, and a random access memory (RAM) 4, such as a Hitach HM62256LP-15 for example, for storing various data required for the operation of the microprocessor 2 such as the arithmetic operation, both memories being connected to the microprocessor 2 via the bus line 1 of a driver circuit 5 connected to the bus line 1 and to an line feed (LF) motor 6, for issuing a drive pulse to the LF motor 6, and of an interface (I/F) control part 7, NEC μPD8255AC-2 for example, connected to the bus line 1 for receiving serial data input from a host side via an I/F connector 8 connected thereto and for oppositely transmitting predetermined information to the host side via the I/F connector 8.

Figure 2:
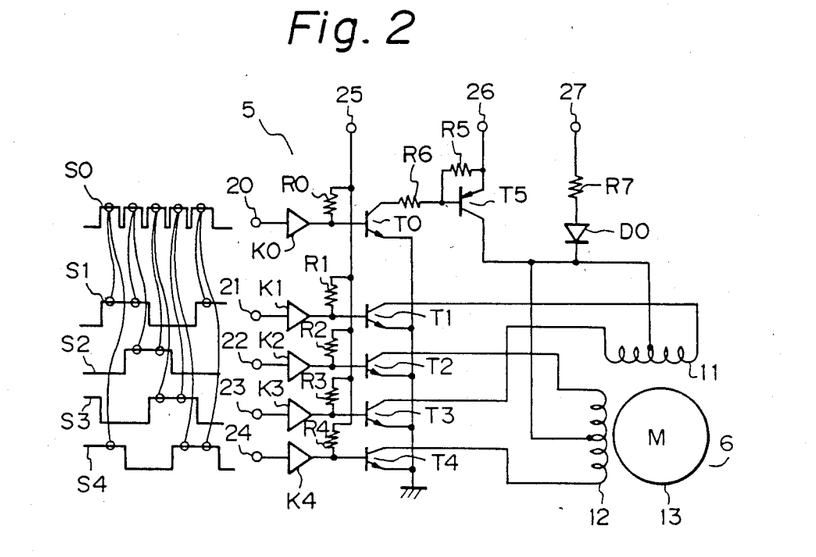
FIG. 2 is a circuit diagram illustrating a drive circuit of a line feed motor of FIG. 1.

Referring further to FIG. 2, the driven circuit 5 of FIG. 1 is illustrated in detail. The LF motor 6 shown is a unipolar driving two-phase excitation stepping motor wherein a rotor 13 is rotated by rotating a composite magnetic field vector produced by a pair of excitation coils 11, 12 wound around a stator. The well-known drive circuit 5 receives at input terminals 21 to 24 rotation control signals S1 to S4, shifted $\pi/2$ in their phases, and at an input terminal 20 a driving control signal S0. The control signals S0 to S4 are fed from the microprocessor 2 of FIG. 1. The input terminals 20 to 24 are connected to the bus line 1 of FIG. 1. The rotation control signals S1 to S4 are fed to NPN transistors T1 to T4 which send in turn excitation currents to the excitation coils 11, 12 through drivers K1 to K4. Additionally, the driving control signal S0 is fed to a PNP transistor T5, which constitutes a switching circuit together with resistors R5 and R6, through a driven K0 and a NPN transistor T0. The switching circuit controls, when it is on, the excitation of the excitation coils 11, 12 in a predetermined timing for rotation of the rotor 13. The drivers K0 to K4 are pulled up through resistors R0 to R4 by voltage supplied from a power supply (not shown) to a terminals 25. The excitation currents for the excitation coils 11, 12 are supplied, when the transistor T5 is switched on, from a power supply (not shown) through a terminal 26. A terminal 27 supplies a retaining current, when the transistor T5 is switched off from a power supply (not shown) through a resistor R7 and a diode D0 to the excitation coils 11, 12 when the rotor 13 is stopped and any two of the transistors T1 to T4 are turned on, for retaining the rotor 13 with predetermined retaining torque. The driving control signal S0 is intermittently supplied at a predetermined repetition frequency during the rotation of the LF motor 6. The driving control signal S0 controls the driving of the LF motor 6, with which signal the LF motor 6 is driven in case the signal S0 is substantially turned on without interruption. Application of each pulse of the driving control signal S0 rotates the rotor 13 by an electrical angle of $\pi/2$.

Figure 3:
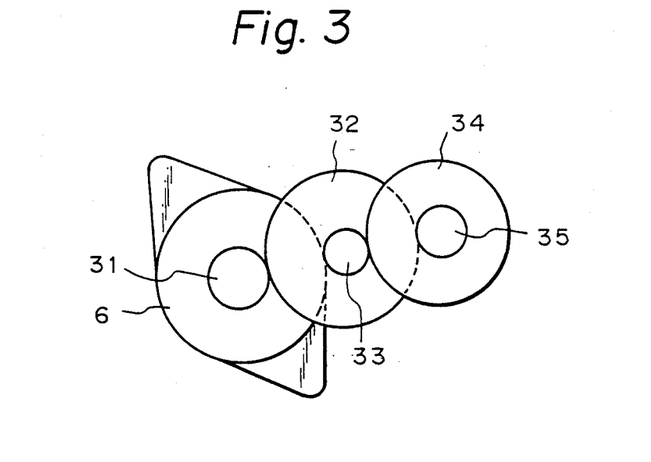
FIG. 3 is a front view illustrating a speed reduction mechanism of the line feed motor of FIG. 1.

Referring to FIG. 3, a speed reduction mechanism of the LF motor is illustrated. A spur gear 31 mounted on an output shaft of the LF motor 6 is engaged with a large diameter spur gear 32, which is fixedly mounted on a small diameter spur gear 33 coaxially therewith. The small diameter spur gear 33 is further engaged with a large diameter spur gear 34, which is coupled directly to a platen shaft 35. The spur gear 31, spur gears 32 and 33, and spur gear 34 are hereinafter referred to as a motor gear, idle gears, and a platen gear.

Figure 4A:
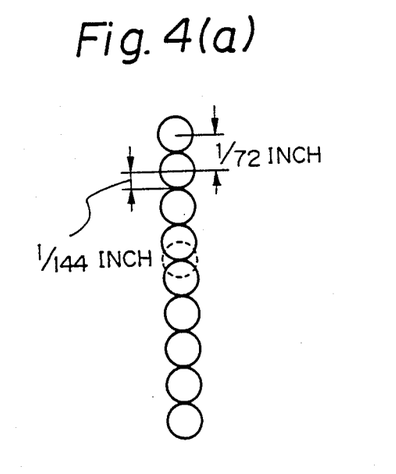
FIG. 4 is a view illustrating the arrangements of prior printing wires.
Figure 4B:
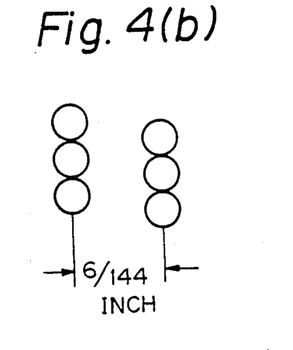

Referring further to FIGS. 4(a) to 4(b), printing wires of the print head provided in the printing part 9 of FIG. 2 are schematically illustrated. The print head is composed of a disk-shaped base, a cylindrical permanent magnet, a plurality of electromagnets located in close vicinity to the permanent magnet on the internal periphery side thereof, and armatures each provided on divided pieces which are formed by dividing a circular leaf spring coaxially, for fixedly mounting thereon the printing wires. Upon printing, respective electromagnets are selectively energyzed, and the armatures attracted by the respective electromagnets to cores thereof are released by a biassing force of the leaf spring for the printing by the printing wires.

Figure 4C:
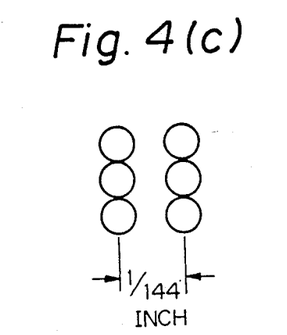
Figure 4D:
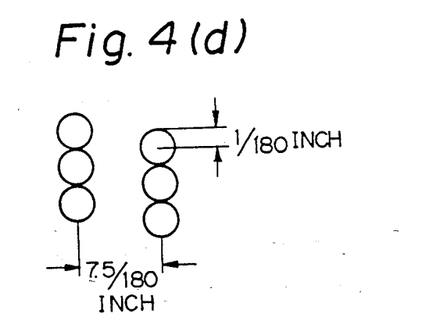

As illustrated in FIGS. 4(a) to 4(b), (a) shows printing wires, on the heads thereof, of the 9 wire type head, (b) and (c) show printing wires of the 18 wire type heads each arranged in 2 lines ×9 wires, and (d) shows printing wires of the 24 wire type head arranged in 2 lines ×12 wires. In FIGS. 4(b) to (d), only three wires are shown for each line of the wires. A printing sheet is fed along the surface of the drawing vertically on the same. The nine printing wires in FIG. 4(a) are spaced apart 1/72 inch (1 inch=2.54 cm) for example. Such a dot wire type print head typically allows overlapped printing where a distance between adjacent longitudinal printing dots is shortened as shown by a broken circle in the figure. It is therefore necessary to rotate the platen by a multiple of an integer of ½ as much as the distance between adjacent printing wires. The platen should accordingly be driven each 1/144 inch. The same shall be applied to the 18 wire type head shown in FIG. 4(b). Here, two lines of the wires of the 18 wire type head of FIG. 4(b) are shifted with each other vertically on the drawing surface by ½ of the wire diameter, and the wires of FIG. 4(c) are located vertically at the same positions for each line. Additionally, in the 24 wire type head of FIG. 4(d) the adjacent printing wires are spaced apart 1/90 inch, requiring the platen to be driven in the step of 1/180 inch. Likewise, the 24 wire type head is required to be driven in the step of 1/120 inch.

Conventionally, a stepping motor (LF motor) 6 is rotated 7.5° for each step of rotation.

Operation of the control circuit of the printer arranged as such is as follows.

As illustrated in FIG. 1, printing data is input from the host side into the interface control part 7 via the interface connector 8, and stored in the RAM 4. The microprocessor 2 reads the printing data and prepares a predetermined printing signal for driving the printing part 9. The microprocessor 2, after completing the printing of one line, supplies a line feed signal to the drive circuit 5. That is, the microprocessor 2 supplies the driving control signal S0 and the rotation control signals S1 to S4 shown in FIG. 2 to the drive circuit 5 of the LF motor 6 for a predetermined time interval. The LF motor 6 is thereby rotated by a predetermined angle of the rotation.

With the LF motor 6 being driven as such, the rotary speed thereof is reduced in a predetermined ratio through the motor gear 31, idle gears 32, 33, and platen gear 34, for rotation of the platen by a predetermined angle.

Figure 5:
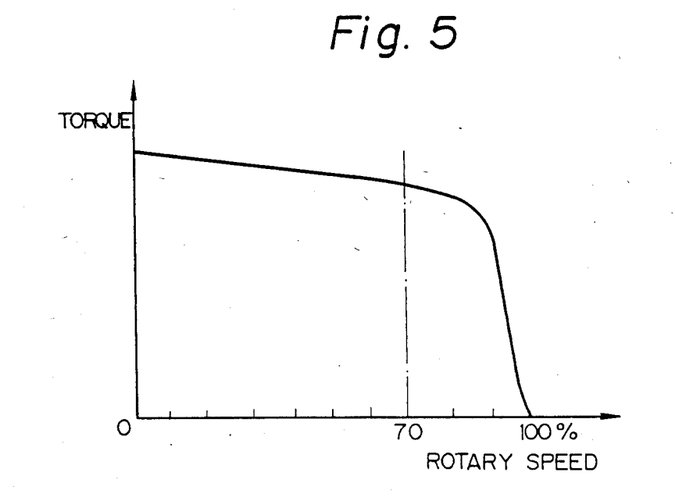
FIG. 5 is a graphical view illustrating a relationship between the rotational speed and the torque in the stepping motor.

Referring here to FIG. 5, a relationship between the torque of the LF motor and the number of revolutions thereof (rotary speed) is illustrated. With the rotary speed of the LF motor taken on the horizontal axis, the driving torque of the LF motor is steeply lowered as the rotary speed exceeds 90% assuming the maximum rotary speed to be 100% at which the LF motor can follow up a driving pulse. Thus, the LF motor may often be operated at the rotary speed of about 70%.

Here, there are many types of printers capable of mounting varieties of the print heads as shown in FIG. 4. It is desirable thereupon to employ the same driving mechanism for platens of those printers for the purpose of reducing the number of parts needed.

For example, printers mounting thereon the 9 wire type print head of FIG. 4(a) and the 24 wire type print head of FIG. 4(d) employ respectively different, for example, gear ratios (ratio of the number of cogs) with respect to the idle gears (spur gears 32, 33 of FIG. 3) and the platen gear (spur gear 34 of the same figure). The LF motor 6 is also commonly used for those different situations. There are required, however, different parts such as platen gears and idle gears for each type of the printers, thus insufficiently reducing the number of parts needed. Additionally, alteration of the speed reduction ratio (gear ratio) causes an increase or a decrease of the torque of the LF motor as illustrated in FIG. 5. That is, the decrease of the motor torque disadvantageously produces insufficient force of feeding a printing sheet by a platen. Conversely, the increase of the motor torque produces an increase of the retaining torque, making operation difficult when setting a printing sheet by manual rotation of the platen by an operator.

SUMMARY OF THE INVENTION

It is an object of the present invention to provide a stepping motor control apparatus capable of control of the rotational angle of a stepping motor with ease.

Another object of the present invention is to provide a stepping motor control apparatus capable of control of the rotational angle of a stepping motor by controlling a composite magnetic field of the stepping motor.

Still another object of the present invention is to provide a stepping motor control apparatus capable of reducing the number of parts needed and of improving insufficient torque and solving problems in the operation of the apparatus.

In accordance with the present invention, a stepping motor control apparatus for a polyphase excitation stepping motor is composed of a plurality of control circuits provided independently for each of a plurality of excitation coils for generating a rotating composite magnetic field to control variably rotation of a rotor of the pulse motor at an angle of a multiple of a real number of a predetermined unit angle at a time.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 6:
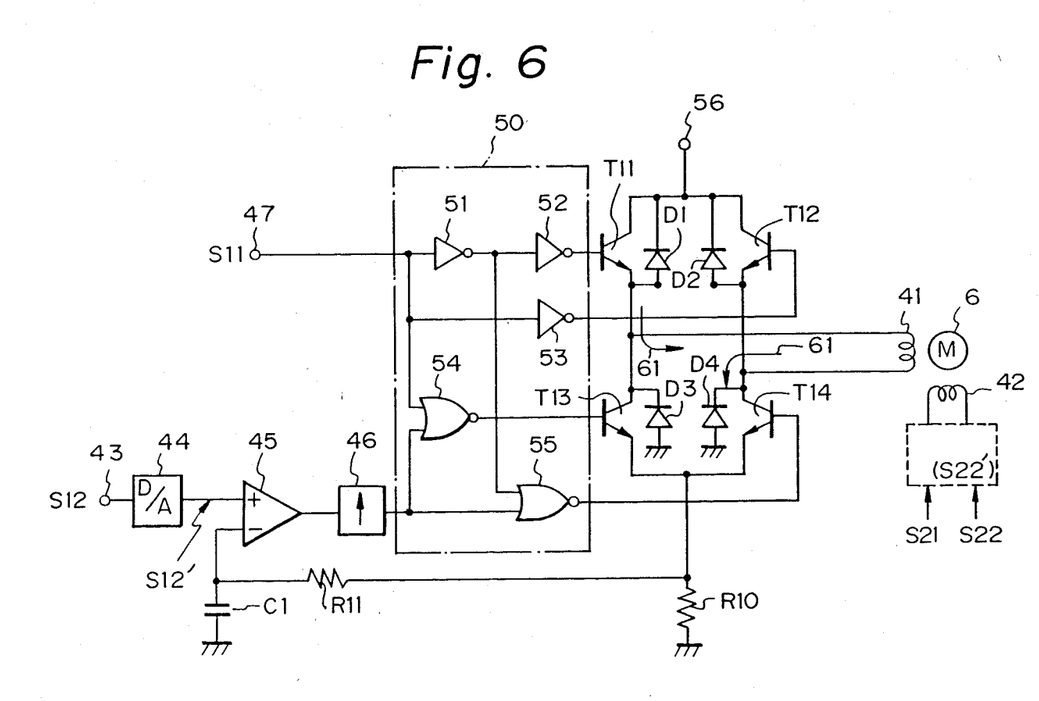
FIG. 6 is a circuit diagram illustrating an embodiment of a stepping motor control apparatus according to the present invention.

Referring to FIG. 6, an embodiment of a stepping motor control apparatus according to the present invention is illustrated. A stepping motor 6, a bipolar driving two-phase excitation type stepping motor, includes a couple of excitation coils 41, 42 which generate a rotating composite magnetic field vector for rotating a rotor thereof. The stepping motor control apparatus controls variably and independently excitation currents supplied to the excitation coils 41, 42.

Here, as shown in FIG. 6, the apparatus provides the excitation current only to the excitation coil 41 for simplicity. However, terminals for the excitation coil 42 corresponding to terminals 47, 43 for the excitation coil 41 are supplied with similar signals as signals S11 and S12 for the excitation coil 41.

The apparatus is comprised of: a digital-to-analog (D/A) converter 44 connected to the input terminal 43 for D/A converting the control signal S12 supplied from the input terminal 43 for determining the excitation current to be supplied to the excitation coil 41; a comparator (comparator means) 45 having inputs connected to the D/A converter 44 at a non-inverting input thereof and connected to a feedback circuit at an inverting input thereof for comparing the excitation magnitude control signal (first control signal) S12 with a feed back signal fed back through the feedback circuit from a later stage; a monostable multivibrator (excitation interval setting means) 46 connected to the comparator 45 and which changes its logical state to a high level at a trailing edge of the output from the comparator 45 for a predetermined time interval, for interrupting the excitation current flowing through the excitation coil 41; a logical circuit (control signal selecting and setting means) 50 composed of inverters 51, 52, and 53, and of NOR gates 54, 55, and connected to the terminal 47 and to the monostable multivibrator 46 for conducting the excitation current in a predetermined direction through the excitation coil 41 when a logical high level signal is input therein from the terminal 47 with a logical low level signal being input therein from the multivibrator 46 or for doing the same but in the opposite direction to the foregoing predetermined direction when a logical low level signal is input therein from the same terminal 47 with the logical low level signal input therein from the multivibrator 46; and a switching circuit (switching means) composed of transistors T11, T12, T13, and T14, and commutation diodes D1, D2, D3, and D4, and connected to the logical circuit 50 and to the excitation coil 41, for conducting or interrupting the excitation current therethrough or reversing the same in the direction thereof in response to the excitation magnitude control signal S12 and to the excitation polarity control signal S11.

In the logical circuit 50, the input of the inverter 51, the input of the inverter 53, and one input of the NOR gate 54 are connected to terminal 47. The output of the inverter 51 is connected to the input of the inverter 52 and to one input of the NOR gate 55. The input of NOR gate 54 and the other input of the NOR gate are connected to the monostable multivibrator 46.

In the switching circuit, the transistor T11 is connected at its base to the output of the inverter 52, at its collector to a terminal 56, to which a power supply (not shown) is connected for supplying power for the excitation current. The cathodes of the diodes D1, D2, and the collector of the transistor T12 are also connected to terminal 56. The emitter of transistor T11 is connected to one end of the excitation coil 41, to the collector of the transistor T13, to the anode of diode D1, and to a cathode of the diode D3. The transistor T13 is connected at its base to an output of the NOR gate 54, and at its emitter to the feedback circuit and the emitter of the transistor T14. The transistor T12 is connected at its emitter to the cathode of the diode D4, to the anode of diode D2, to the collector of the transistor T14, and to the other end of the excitation coil 41, and connected at its base to the output of: the inverter 53. The transistor T14 is connected at base to the output of the NAND gate 55.

The feedback circuit is comprised of a resistor R10 connected at its one end to the emitters of the transistors T13, T14, and to a ground potential at the other end; a resistor R11 connected at one end to one end of the resistor R10; and of a capacitor C1 connected at one end to the inverting input of the comparator 45 together with the other end of the resistor R11, and at the other end to a ground potential.

In the following the operation of the embodiment of the stepping motor control circuit arranged as such will be described with reference to FIG. 8.

The excitation polarity control signal S11, a second control signal, is input into the control circuit via the input terminal 47 to bring the input terminal 47 to a high level. Simultaneously, the excitation magnitude control signal (pulse width modulated digital signal) S12, The first control signal, corresponding to a predetermined excitation current is input into the D/A converter 44 via the terminal 43. A resulting D/A converted signal S12 is input into the non-inverting input of the comparator 45 whose output thereby rises in turn. The monostable multivibrator 46 maintains a low level at its output at ordinary time and is triggered by the trailing edge of the output from the comparator 45 to change to a high level for a predetermined time interval. When the logical circuit 50 receives the high level signal through the terminal 47 and the low level signal from the monostable multivibrator 46, the transistors T11 and T14 in the switching circuit are switched on. Hereby, the excitation current is conducted through the excitation coil 41 from a power supply (not shown) connected to a terminal 56 as shown by the arrow 61 in FIG. 6. A voltage proportional to the excitation current appears across the resistor R10, and is fed back to the inverting input of the comparator 45 through the resistor R11. The excitation current flowing through the excitation coil 41 gradually increases after the transistors T11 and T14 are switched on.

Figure 7:
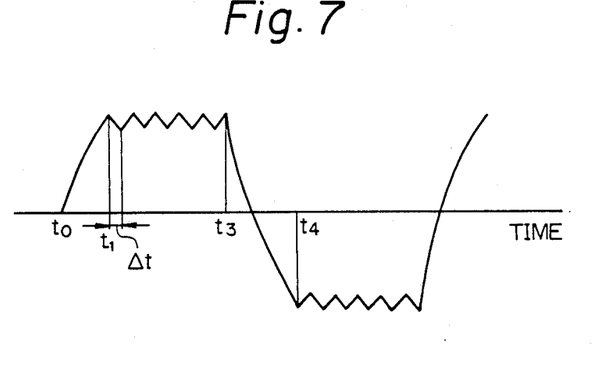
FIG. 7 is a view illustrating a waveform of a driving current supplied to the stepping motor of the present invention.

FIG. 7 illustrates the situation described above. That is, the switching circuit is switched on at time $t_0$, and at time $t_1$ the detected fed back current exceeds the first control signal input to the non-inverting input of the comparator 45. Hereby, the comparator 45 lowers its output. In this timing, the monostable multivibrator 46 changes its output to a high level to switch off the transistor T14. No excitation current through the excitation coil 41 is caused by the transistor T14 being switched off, whereby no signal is detected by the resistor R10 to result in the comparator 45 raising its output. Meanwhile, the monostable multivibrator 46 changes its output to a low level after a predetermined time interval $\Delta t$ to again switch on the transistor T14.

Such an operation is repeated up to time $t_3$ shown in FIG. 7 to keep the excitation current unchanged. At time $t_3$, the control signal S11 input through the terminal of FIG. 6 changes to a low level, whereby the transistor T11 is switched off to interrupt the excitation current flowing through the excitation coil 41. Here, the diodes D1 to D4, called commutation diodes, bypass the excitation coil 41 for the excitation current flowing therethrough when the transistors T11 to T14 are switched on or off.

Moreover, when as illustrated in FIG. 7, the second control signal input into the logical circuit 50 of FIG. 6 through the input terminal 47 changes to a low level, the transistor T12 is switched on while the transistor T13 switched off, because of the monostable multivibrator 46 having been kept at the low level. Hereby, the excitation current is reversed in its flowing direction (polarity) oppositely to the arrow 61 shown in FIG. 6. Operation after the time instant $t_3$ is as previously described.

The stepping motor control apparatus of FIG. 6 enables in such a manner a predetermined excitation current in response to a signal voltage, the first control signal, for current control input into the non-inverting input of the comparator 45 to be supplied to the excitation coil 41.

Furthermore, the excitation coil 41 is also operated in the same manner, the description of which omitted here for simplification.

In the following, a procedure will be described for controlling stepwise the excitation currents supplied to the excitation coils 41, 42 for rotating the stepping motor 6 of FIG. 6 a predetermined unit angle at a time.

Figure 8:
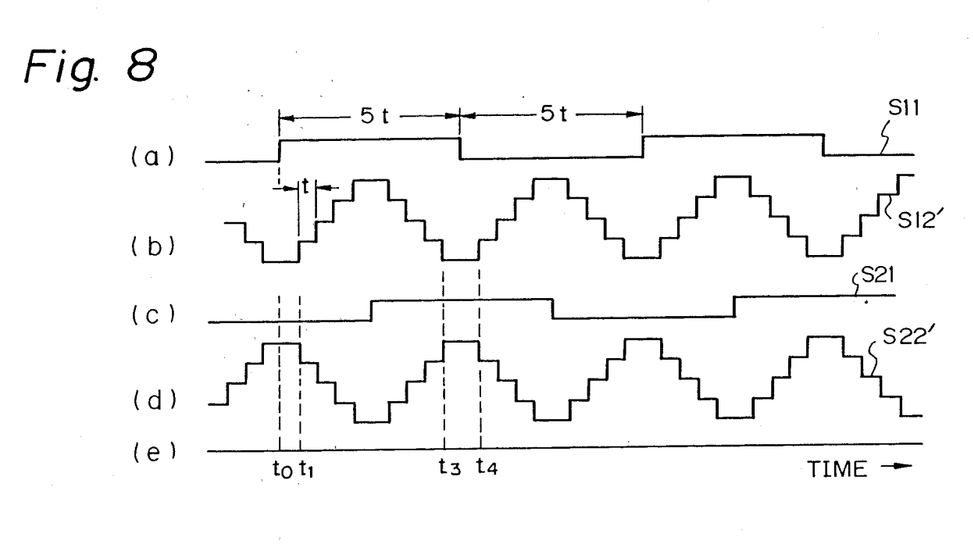
FIG. 8 is a view illustrating waveforms illustrating control signals supplied to the stepping motor control apparatus of the present invention.

FIG. 8 depicts waveforms illustrating (a) the second control signal S11 of FIG. 6 for controlling the flow direction (polarity) of the excitation current through the excitation coil 41, (b) the first control signal S12' for controlling the magnitude of the excitation current, and likewise (c) a second control signal S21 for controlling the flow direction of an excitation current through the excitation coil 42 and (d) a first control signal S22' for controlling the magnitude of the excitation current flowing through the excitation coil 42. As illustrated in FIG. 8, the second control signals S11 and S21 for controlling the directions of the excitation currents flowing through the two excitation coils 41 and 42 (FIG. 6) are shifted in their phases respectively by $\pi/2$. While the first control signals S12' and S22' for controlling the magnitudes of the excitation currents flowing through the excitation coils 41 and 42 are supplied so as to periodically increase and decrease stepwise at each time interval t, as illustrated in Fig. 8. In FIG. 8, (e) indicates a time axis for the respective waveforms of (a) to (d). The time interval t is set to 1/10 of a period of the second control signals S11 and S21. That is, when only the second signals S11 and S21, shown as waveforms (a) and (c), for reversing the directions of the excitation currents flowing through the excitation coils 41 and 42 are supplied to the excitation coils 41 and 42, the pulse motor is rotated $\pi/2$ at a time at each time interval $5t/2$. Provided here ratios of the magnitudes of the excitation currents supplied to the excitation coils 41 and 42 with respect to those excitation currents at the time instant $t_1$ are changed stepwise at each time interval t at a time S0 as for those ratios to be increased and decreased as illustrated in waveforms (b) and (d), the rotor of the pulse motor is rotated finely at each angle of 1/5 of $\pi/2$ at a time. It is thus made possible in the present embodiment to control the rotational angle of the rotor correspondingly to a multiple of an integer of 1/5 of $\pi/2$ at a time.

Table 1 shown below lists a relationship between the line feed pitches in print heads of various types and those in a reference mechanism when the predetermined line feed pitches are set to the speed reduction mechanism of FIG. 3 as the reference mechanism.

TABLE 1

| Line Feed Pitch (inch) | Reference Mechanism | | | |
|---|---|---|---|---|
| | 1/360 | 1/288 | 1/240 | 1/180 |
| 1/360 | 1 | 4/5 | ⅔ | ½ |
| 1/288 | 1 + ¼ | 1 | 5/6 | ⅝ |
| 1/240 | 1 + ½ | 1 + 1/5 | 1 | ¾ |
| 1/180 | 2 | 1 + 3/5 | 1 + ⅓ | 1 |
| 1/144 | 2 + ½ | 2 | 1 + ⅔ | 1 + ¼ |
| 1/120 | 3 | 2 + 2/5 | 2 | 1 + ½ |
| 1/8 | 45 | 36 | 30 | 22 + ½ |
| 1/6 | 60 | 48 | 40 | 30 |

According to Table 1, when the line feed pitch in the reference mechanism is assumed as 1/360 inch and that in a required print head assumed as 1/360 inch, a line feed of 1/360 inch is achieved by only one pulse. But, when line feed pitch of 1/288 inch is required, it is achieved by $(1 + \frac{1}{4})$ pulses. The pulse motor is accordingly needed to be rotated at a unit angle ¼ as much as a rotational angle of the rotor rotated by one pulse.

FIG. 8 is an example where the reference mechanism takes 1/288 inch as the line feed pitch. In this case, rotational angle control with assumption of an angle 1/5 as much as one rotated by one pulse as a unit angle assures the line feed pitches of all the sorts listed in Table 1.

Figure 9:
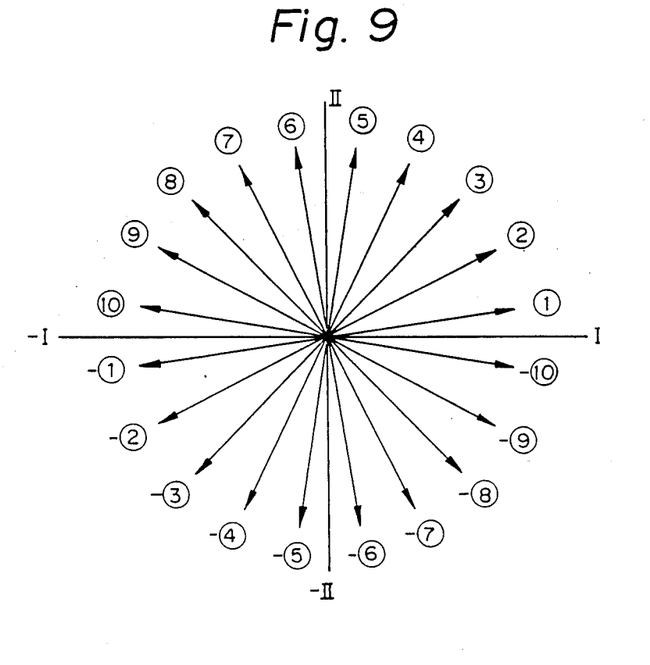
FIG. 9 is a view illustrating magnetic field vectors generated by excitation coils of the stepping motor of the present invention.

Additionally, Table 2 lists proportional values of the respective excitation currents shown in FIG. 8. And, FIG. 9 illustrates vectors of composite magnetic fields formed by a pair of the excitation coils 41, 42 (FIG. 6) when the proportional current values of Table 2 are set. In FIG. 9, the corresponding vectors − ① to − ⑩ shows, respectively, vectors with the same length and the phase difference $\pi$ between the vectors −① to −⑩ and the vectors 1 to 10.

TABLE 2

| No. | (°) | I (cos θ) | II (sin θ) |
|---|---|---|---|
| ① | 9 | 0.988 | 0.156 |
| ② | 27 | 0.891 | 0.454 |
| ③ | 45 | 0.707 | 0.707 |
| ④ | 63 | 0.454 | 0.891 |
| ⑤ | 81 | 0.156 | 0.988 |
| ⑥ | 99 | −0.156 | 0.988 |
| ⑦ | 117 | −0.454 | 0.891 |
| ⑧ | 135 | −0.707 | 0.707 |
| ⑨ | 153 | −0.891 | 0.454 |
| ⑩ | 171 | −0.988 | 0.156 |

Here,
I : excitation current ratio in the excitation coil 41;
II : excitation current ratio to the excitation coil 42;
θ: angles among magnetic field vectors.

When the excitation currents each flowing through the excitation coils 41 and 42 are set to a ratio listed in Table 2, an angle $\theta$ between composite magnetic field vectors formed by the two excitation coils 41 and 42 is expressed by a relation $\theta = \tan^{-1} II/I$. That is, the magnetic field vector is rotated the unit angle $\theta$ at a time.

Here, a magnetic field vector ① shown in FIG. 9 for example is formed by setting a ratio of the excitation current through the excitation coil 41 to that through 42 to 0.988:0.156. Alteration of the ratio to 0.891:0.454 causes the vector to rotate counterclockwise by a unit angle 18° as shown by ② in FIG. 9. Hereby, the motor shaft of the stepping motor is rotated each 18° at a time in its electrical angle. A usual stepping motor is in contrast with the present embodiment rotated each $\pi/2$ at a time as shown by ③, ⑧, and -③, and -⑧ in FIG. 9. In other words, the present embodiment divides the one step in this case into 1/5.

Hereupon, as listed in Table 2, the excitation current ratios I and II in the excitation coils 41 and 42 are selected to satisfy relations $\cos \theta$ and $\sin \theta$ respectively, so that the magnitudes of the composite magnetic field vectors are all made equal to each other because of a relation $\sqrt{\cos^2 \theta + \sin^2 \theta} = 1$ holding at all times. The driving torque of the stepping motor can accordingly remain unchanged all the time.

Supply, in such a manner, of the control currents as illustrated in FIG. 8 enables the drive circuit of FIG. 6 to rotate the pulse motor each unit angle at a time.

Here, there is known the so-called retaining torque reducing method wherein the excitation current for driving the stepping motor at a stationary state thereof in the drive circuit of FIG. 6 for example is reduced by about 1/5 to 1/10 compared with that in driving of the same. Thereupon, the retaining torque can be set satisfactorily in the present embodiment by controlling the pulse width modulation signal supplied to the D/A converter 44 so as to change the on/off duty cycle thereof between driving and stationary states of the stepping motor.

The drive circuit of FIG. 6 thus assures control of the rotational angle of a stepping motor at the unit angle divided into one-to-a multiple of an integer of the minimum rotational angle of a prior stepping motor. The larger the divided number, the more the torque characteristics of the stepping motor are improved. The divided number may be a real number instead of an integer.

Figure 10:
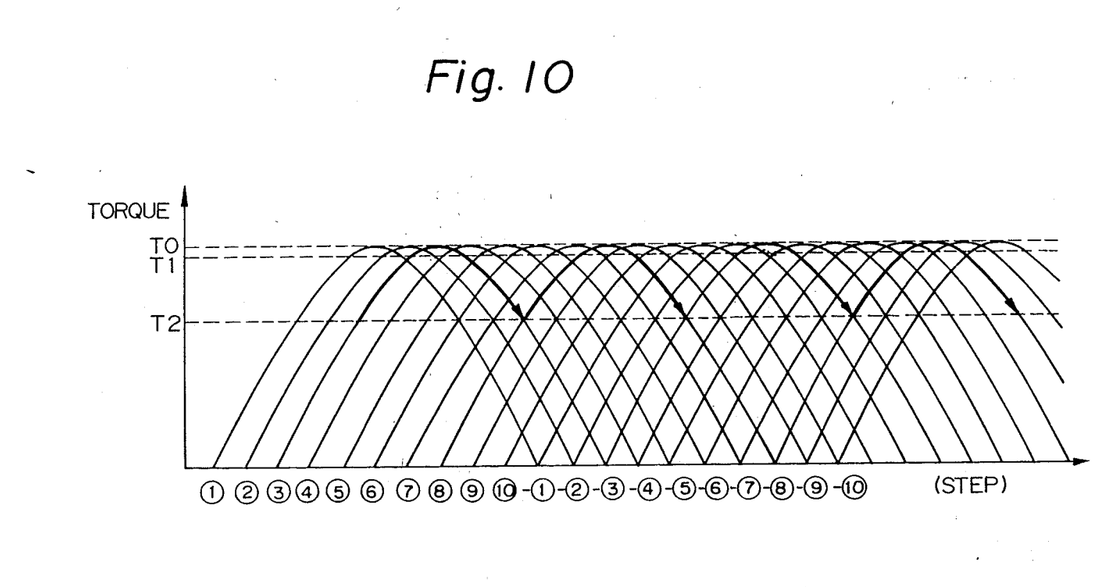
FIG. 10 is a graphical view illustrating the characteristics of the torque with respect to the magnetic field vectors of FIG. 9.

FIG. 10 illustrates the situation described above. The figure depicts steps of the respective vectors from ① to ⑩ and -① to -⑩ of FIG. 9 on the axis of abscissa while depicting driving torque at each step on the axis of ordinate. In step ① for example, the driving torque increases to the maximum To and then decreases, drawing substantially a sinusoidal curve in FIG. 10. Here, when the divided number is given as shown in Fig. 9, the torque increases and decreases between To and T1 as illustrated in FIG. 10. Against this, in a usual stepping motor which is rotated $\pi/2$ at one time, the torque thereof varies between To and T2, allowing stepping very wide fluctuation thereof. Thus, the present invention can also sharply reduce torque ripple.

Although the invention has been described in its preferred form with a certain degree of particularity, it is to be understood that many variations and changes are possible in the invention without departing from the scope thereof.

What is claimed is:

1. A drive circuit apparatus for a stepping motor control apparatus, the drive circuit apparatus for cooperating with at least one other drive circuit to drive a plurality excitation coils such that the plurality of excitation coils generate a rotating composite magnetic field to variably control a rotation of a rotor of the stepping motor, the drive circuit apparatus comprising:

a digital-to-analog converter means for converting a first digital control signal to a corresponding first analog control signal, said first digital control signal specifying a conduction, interruption, and magnitude of an excitation current to be supplied to one of the plurality of excitation coils;

a comparator circuit having a non-inverted input for receiving said first analog control signal and having an inverted input for receiving a feedback signal indicative of an amplitude of said excitation current;

an excitation interval setting means, coupled to said comparator circuit, for outputting a logic signal having a changing logic state according to a predetermined time interval and responsive to an output of said comparator circuit, said predetermined time interval specifying an excitation interval of said excitation current;

a control signal switching means, coupled to said excitation interval setting means, for receiving a second digital control signal specifying a polarity of said excitation current, and for receiving said logic signal output by said excitation interval setting means, and for outputting at least one switching control signal indicative of the conduction, interruption, and polarity of said excitation current;

a switching means, coupled to said control signal switching means and having means for connection to a power supply and to the one of the plurality of excitation coils, for selectively connecting the power supply to the one of the plurality excitation coils to obtain said excitation current according to said at least one switching control signal output by said control signal switching means; and, a feedback means, coupled to said switching means and said comparator circuit, for supplying said feedback signal to said comparator circuit.

2. A drive circuit apparatus according to claim 1, wherein said switching means includes: a first transistor connected at its base to said control signal switching means, at its collector to a terminal having means for connection to the power supply and to cathodes of first and second commutation diodes whose anodes are connected to the emitter of said first transistor, and at its emitter to one end of the excitation coil; a fourth transistor connected at its base to said control signal switching means, at its collector to the other end of said excitation coil and to a cathode of a fourth commutation diode whose anode is connected to a ground potential, and at its emitter to said feedback means, wherein said first and fourth transistors conduct a current from the power supply through said excitation coil as said excitation current in a first direction when said excitation interval setting means issues a logical low level signal and said second control signal is a logical high level signal; a second transistor connected at its base to said control signal switching means, at its collector to the terminal having means for connection to the power supply, and at its emitter to the collector of said fourth transistor and to an anode of said second commutation diode; and a third transistor connected at its base to said control signal switching means, at its collector to the emitter of said first transistor and to a cathode of a third commutation diode whose anode is connected to a ground potential, and at its emitter to the emitter of said fourth transistor, wherein said third and second transistors conduct said excitation current in a second direction opposite said first direction when said monostable multivibrator issues a logical low level signal and said second control signal is a logical low level signal.

3. A drive circuit apparatus according to claim 1, wherein said control signal switching means includes: a first inverter having input therein said second digital control signal; a second inverter having its input connected to an output of said first inverter and its output connected to said base of said first transistor of said switching means; a third inverter having input therein said second digital control signal and having its output connected to said base of said second transistor of said switching means; a first NOR gate having input to one input thereof said second digital control signal and having its other input connected to the output of said excitation interval setting means and having its output connected to said base of said third transistor of said switching means; and a second NOR gate having one input connected to said output of said first inverter and another input connected to the output of said excitation interval setting means, and having an output connected to said base of said fourth transistor of said switching means.

* * * * *